US009694406B2

(12) United States Patent
    Cagle

(10) Patent No.: US 9,694,406 B2
(45) Date of Patent: Jul. 4, 2017

(54) MOTORCYCLE FRAME RACK

(71) Applicant: Allen Cagle, San Carlos, CA (US)

(72) Inventor: Allen Cagle, San Carlos, CA (US)

(*) Notice: Subject to any disclaimer, the term of this patent is extended or adjusted under 35 U.S.C. 154(b) by 244 days.

(21) Appl. No.: 13/839,293

(22) Filed: Mar. 15, 2013

(65) Prior Publication Data

US 2013/0283876 A1    Oct. 31, 2013

Related U.S. Application Data

(60) Provisional application No. 61/639,901, filed on Apr. 28, 2012.

(51) Int. Cl.
| | |
|---|---|
| *B21D 1/14* | (2006.01) |
| *B21D 3/16* | (2006.01) |
| *B62K 11/02* | (2006.01) |
| *B21D 11/22* | (2006.01) |
| *G01B 5/00* | (2006.01) |
| *G01B 11/24* | (2006.01) |
| *B25H 1/00* | (2006.01) |

(52) U.S. Cl.
CPC ............... *B21D 3/16* (2013.01); *B21D 1/14* (2013.01); *B21D 11/22* (2013.01); *B25H 1/0014* (2013.01); *B62K 11/02* (2013.01); *G01B 5/0025* (2013.01); *G01B 11/24* (2013.01); *Y10T 29/49618* (2015.01)

(58) Field of Classification Search
CPC ... B21D 1/12; B21D 1/14; B21D 3/16; B21D 11/22; Y10T 29/49618; B25H 1/0014
See application file for complete search history.

(56) References Cited

U.S. PATENT DOCUMENTS

| | | | |
|---|---|---|---|
| 4,088,002 | A | 5/1978 | Andrew |
| 4,432,144 | A | 2/1984 | Carlsson |
| 4,603,570 | A | 8/1986 | Dehn |
| 4,615,618 | A | 10/1986 | Bailey et al. |
| 4,621,435 | A | 11/1986 | Higginbotham |
| 4,691,443 | A | 9/1987 | Hamilton |
| 4,731,936 | A | 3/1988 | Aldrich et al. |
| 4,997,283 | A | 3/1991 | Danielson et al. |
| 5,029,397 | A | 7/1991 | Palombi |
| 5,125,164 | A | 6/1992 | Fournier et al. |
| 5,417,094 | A | 5/1995 | Chisum |
| 5,515,613 | A | 5/1996 | Hinson |
| 5,644,854 | A | 7/1997 | Bergeron |

(Continued)

FOREIGN PATENT DOCUMENTS

| | | |
|---|---|---|
| DE | 19810140 A1 | 3/1998 |
| EP | 0458268 A2 | 5/1991 |

(Continued)

OTHER PUBLICATIONS

Office Action, from U.S. Appl. No. 13/839,542, dated Nov. 25, 2014.

*Primary Examiner* — Debra Sullivan
(74) *Attorney, Agent, or Firm* — Haverstock & Owens LLP

(57) ABSTRACT

A motorcycle frame rack enables a motorcycle frame to be repaired without removing many components from the motorcycle. A motorcycle is positioned on the motorcycle frame rack, secured in place and then the frame is adjusted using chains coupled to towers. A self-centering laser measuring system is able to be used to analyze and measure damage to the motorcycle frame.

21 Claims, 16 Drawing Sheets

(56) References Cited

U.S. PATENT DOCUMENTS

| | | | |
|---|---|---|---|
| 5,647,139 A | 7/1997 | Richardson | |
| 6,347,457 B1 | 2/2002 | Espinoza et al. | |
| 7,120,524 B2 | 10/2006 | Srack | |
| 7,600,408 B2* | 10/2009 | Potter et al. | 72/457 |
| 9,073,109 B2 | 7/2015 | Cagle | |
| 2002/0051703 A1 | 5/2002 | Clary | |
| 2002/0062677 A1* | 5/2002 | Ballard et al. | 72/705 |
| 2002/0088128 A1 | 7/2002 | Bremer | |
| 2005/0235731 A1* | 10/2005 | Hess | B21D 1/12 72/457 |
| 2009/0322006 A1* | 12/2009 | Potter | B21D 1/12 269/55 |
| 2013/0286405 A1 | 10/2013 | Cagle | |
| 2015/0260508 A1 | 9/2015 | Cagle | |

FOREIGN PATENT DOCUMENTS

| | | |
|---|---|---|
| EP | 0846944 A1 | 6/1998 |
| EP | 846944 A1 | 6/1998 |

\* cited by examiner

This Point Lower is Universal Straight Shooter

MOTORCYCLE FRAME RACK

CROSS-REFERENCE TO RELATED APPLICATION(S)

This application claims priority under 35 U.S.C. §119(e) of the U.S. Provisional Patent Application Ser. No. 61/639,901, filed Apr. 28, 2012 and titled, "MOTORCYCLE FRAME RACK," which is hereby incorporated by reference in its entirety for all purposes.

FIELD OF THE INVENTION

The present invention relates to the field of motorcycles. More specifically, the present invention relates to motorcycle repair.

BACKGROUND OF THE INVENTION

Until the mid 1970's, if a car was in an accident and sustained frame damage, the car was deemed a "total" economical loss by the insurance companies. They totaled the cars because the technology, equipment and information and training were not yet available to repair shops. That has all changed. By the mid 1980's most reputable body shops had a frame rack.

Representatives from various insurance companies are becoming frustrated with totaling motorcycles without knowing for sure how badly the frames are bent, especially when they can see there is minimal frame damage.

There are only five motorcycle frame shops in all of the United States, one in Arizona and four in California.

The first two are in Sacramento and Anaheim. These two shops use what is known as a peg board system. This system requires the motorcycle to be stripped down. This procedure requires several hours of labor, and they cannot provide documentation, before and after specifications or show the customer a print out that the frame is straight. This is a problem for the insurance companies. They want documentation for their records for any repairs that were performed. Another problem is these two shops require approximately eight weeks before a user gets the motorcycle back.

The other shops are located in San Bruno and Englewood, Calif. and one in Arizona. The equipment they use is called a Motojig. This is a "bench" system made in Italy which is an old and antiquated automobile frame rack in which the motorcycle has to be lifted with a hoist to be put on the "bench." It is a cumbersome, time consuming piece of equipment.

Right now, if a user's motorcycle gets hit while parked or gets involved in a motorcycle accident in California, the bike gets towed to the dealership for repairs. The dealership strips the bike down and pays to have it transported to and from one of the frame shops at a cost to the customer and/or the insurance company.

There are more men and women riding motorcycles than ever before. Some ride to commute and/or ride for economic reasons, some ride for the sport and the thrill of it, while others ride for the lifestyle. The fact of the matter is there has never been this many people riding motorcycles in the streets.

According to the National Highway Traffic Safety Administration as of Dec. 31, 2010, there are over 900,000 registered motorcycles in California alone. There are over 600,000 people a year in the United States that register for a Motorcycle safety course through the Motorcycle Safety Foundation. This is just one of the many accredited Motorcycle safety Schools in the United States. With the price of gasoline going up every other week there are more and more people riding motorcycles and not just nationwide but worldwide.

Additionally, there are thousands of people who race motorcycles all over the world. There are super sport road racers, café racers, the mile, drag racing, TT, flat track, short track, enduro, and all kinds of motor cross, super cross and dirt track races being held all over the world.

With all of these races, there are teams of mechanics and technicians with truck loads of tools and equipment for mechanical repairs and adjustments.

SUMMARY OF THE INVENTION

With the growing popularity of motorcycles and similar modes of transportation, the need for a device and method of repairing the motorcycle's frame is great. A motorcycle frame rack including universal mounting brackets to perform any motorcycle frame repair enables a technician to straighten a motorcycle frame or make a neck rake adjustment much faster and much more cheaply than replacing the frame.

In one aspect, a device for repairing a motorcycle frame comprises a deck, one or more towers positioned near the deck and a cable coupled to each of the one or more towers for coupling to the motorcycle frame for adjusting the motorcycle frame. The device further comprises a universal mounting system for receiving and securing any type of motorcycle to the deck. The device further comprises a ramp for loading a motorcycle on the deck. The device further comprises a measuring system for measuring the motorcycle frame. The measuring system comprises a laser measuring system. The device further comprises a computing device and a printer coupled to the measuring system for receiving measurement information from the measuring system. Before and after frame specifications are accessible by the computing device. The deck comprises a track for enabling the one or more towers to move around the deck. A dolly is used to position the motorcycle on the deck.

In another aspect, a method of repairing a motorcycle frame comprises positioning a motorcycle on a rack, securing the motorcycle to the rack, analyzing the motorcycle frame of the motorcycle, coupling one or more cables to the motorcycle frame, wherein the one or more cables are coupled to one or more towers, adjusting the motorcycle frame to approximately an original configuration. Securing the motorcycle to the rack uses a universal mounting system. Analyzing the motorcycle frame is performed by a laser measuring system. Adjusting the motorcycle frame comprises moving the one or more towers which pull the motorcycle frame in one or more directions. Adjusting the motorcycle frame is performed automatically. Adjusting the motorcycle frame is performed manually. The original configuration is based on factory specifications stored within a computing device coupled to the rack.

In yet another aspect, a device for repairing a motorcycle frame comprises a deck with a track, a universal mounting system configured for receiving and securing any type of motorcycle to the deck, a laser measuring system configured for measuring the motorcycle frame, one or more towers positioned near the deck, wherein the one or more towers are able to move around the deck along the track and a cable coupled to each of the one or more towers for coupling to the motorcycle frame for adjusting the motorcycle frame. The device further comprises A ramp for loading a motorcycle on the deck. The device further comprises a computing device and a printer coupled to the laser measuring system for receiving measurement information from the laser measuring system. Current measured frame information and factory specifications are accessible by the computing device.

DETAILED DESCRIPTION OF THE PREFERRED EMBODIMENT

A motorcycle frame rack (also referred to as the "rack") generally includes one or more towers, a tool board with a universal mounting system and a ramp. In some embodiments, the rack has two towers with ten tons of pulling capability per tower. The pulling capability of the towers is able to be less or greater depending on the need. The universal mounting system mounts and holds steady any make or model motorcycle for frame repair. The ramp is able to be any type of ramp. Examples of ramps include an aluminum ramp or a carbon fiber ramp which are sturdy yet light enough to be picked up and stored when not in use. A dolly and wench system is able to be included to pull a severely damaged motorcycle onto the rack. Any pump is able to operate the two ten ton towers, for example, an electric or hydraulic pump. The rack is able to include a measuring system including a computing device and a printer. The measuring system is able to provide an operator with before and after frame specifications from any motorcycle in the world. The operator is able to measure the motorcycle frame before making the decision to remove a wrecked front end and installing the frame pulling equipment and tooling.

Once the motorcycle is on the frame rack, there are a variety of pull clamps, brackets and/or straps that are able to be used to pull the frame back to factory specifications.

In some embodiments, the rack includes a deck, stand, drop panel, two towers, a two-piece ramp, a dolly, a winch along with a clamp system with numerous tools for mounting motorcycles. There is also a laser measuring system with a rolling stand that will house a computing device, monitor, printer and additional supplies.

Figure 1:
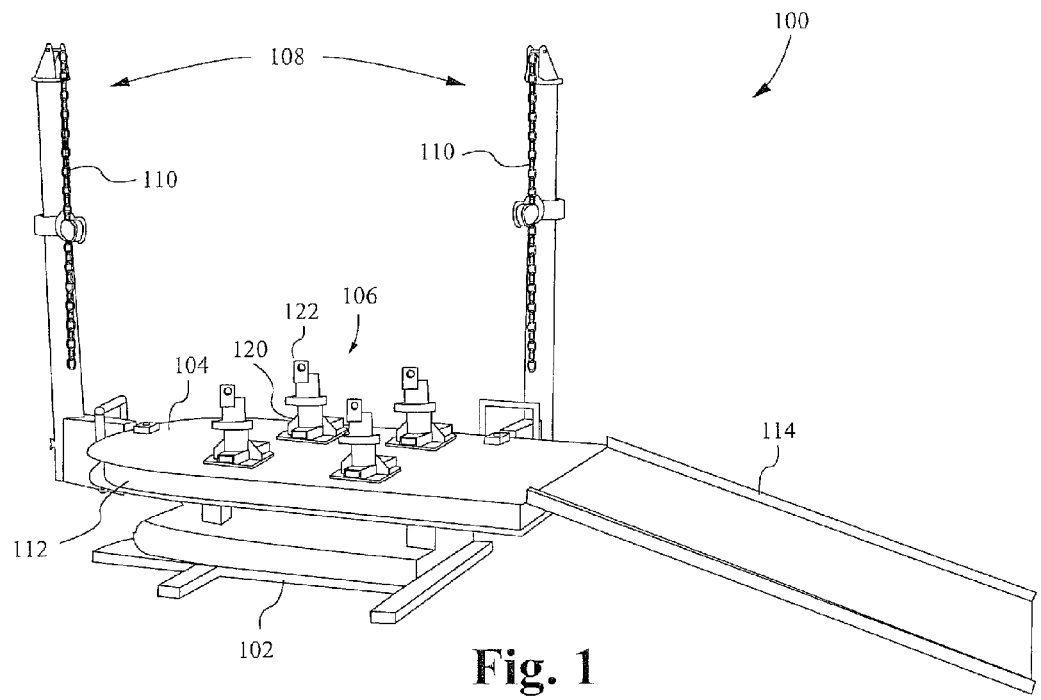
FIG. 1 illustrates a diagram of a rack according to some embodiments.

FIG. 1 illustrates a diagram of a rack according to some embodiments. The rack 100 includes a stand 102 which supports a deck 104 for receiving a motorcycle. The deck 104 includes a universal mounting system 106 for holding the motorcycle in place while the frame of the motorcycle is repaired. The universal mounting system 106 includes a universal clamp 120 and a universal mount 122. One or more towers 108 are positioned on or near the deck 102, and the towers 108 include chains 110 or another pulling mechanism such as a cable. The towers 108 are able to be positioned on a track 112 or path/guide to enable the towers 108 to be moved into a specific position to perform the adjustment of the motorcycle frame. The track 112 permits the towers to slide around the deck 104 while remaining coupled to the deck 104. The towers 108 are able to be locked into place with a locking mechanism. The towers 108 include a mechanism to provide one or more tons of pulling capability. The towers 108 are able to be operated automatically (e.g. by a computing device and/or additional electronics) or manually (e.g. using hydraulics). A ramp 114 is used to allow a motorcycle to be driven or pushed up onto the deck 104. The ramp 114 is able to couple to the deck 104.

Figure 2:
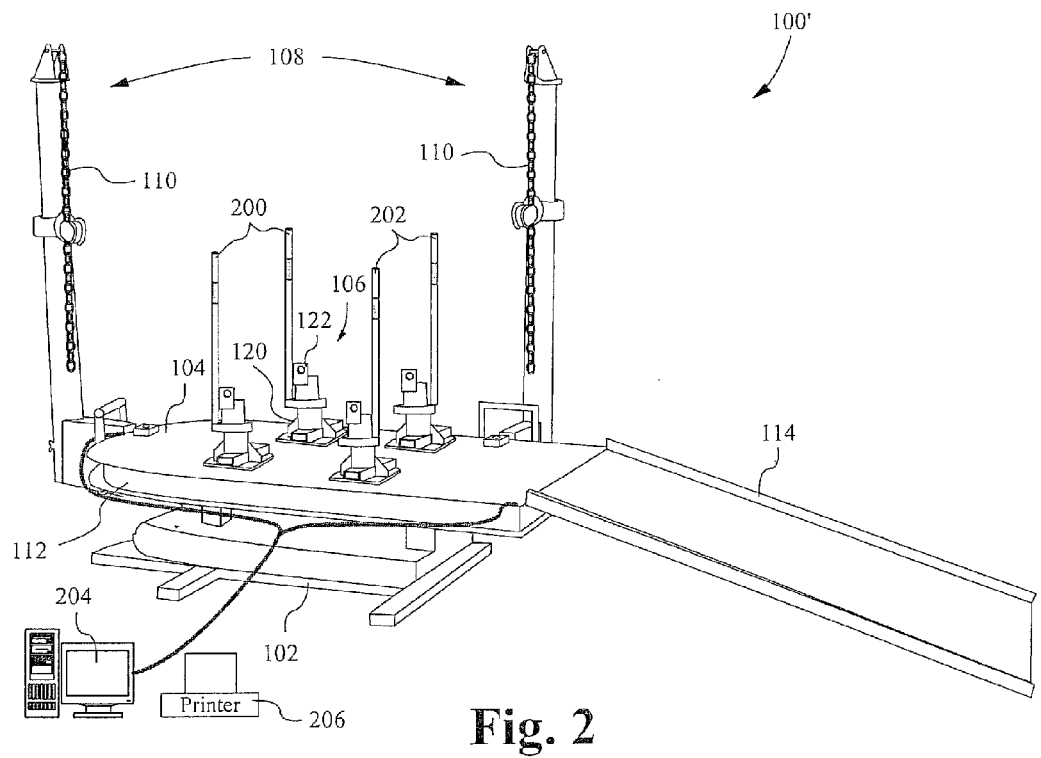
FIG. 2 illustrates a diagram of a rack including a positioning system according to some embodiments.

FIG. 2 illustrates a diagram of a rack including a positioning system according to some embodiments. The rack 100' is similar to the rack 100 of FIG. 1 in that the rack 100' includes a stand 102, a deck 104, a universal mounting system 106, one or more towers 108 with chains 110, a tower track 112 or path/guide and a ramp 114. The rack 100' also includes a measurement system. The measurement system includes a laser measuring and pointing system, a computing device 204 and a printer 206. The laser measuring and pointing system includes a laser transmitter 200 and a laser receiver 202, where the laser transmitter 200 transmits a laser beam and the laser receiver 202 receives the laser beam. The measurement system is able to include one or more laser measuring and pointing systems. In some embodiments, the laser transmitter 200 and the laser receiver 202 are positioned together on a single rod. In some embodiments, the laser measuring and pointing system is coupled to or part of the universal mounting system 106. In some embodiments, the laser measuring and pointing system is coupled to or part of the one or more towers 108. In some embodiments, the laser measuring and pointing system is coupled to or part of the deck 104. The laser measuring and pointing system is able to be movable. In some embodiments, the laser measuring and pointing system is a stand alone device separate from the deck 100. The computing device 204 and the printer 206 are able to include any software or hardware to implement any desired functions such as controlling the towers, analyzing the laser measuring and pointing system data, capturing data, acquiring images for reporting purposes, damage/repair calculations/analysis and any other calculations, functions or data capture/analysis.

Figure 3:
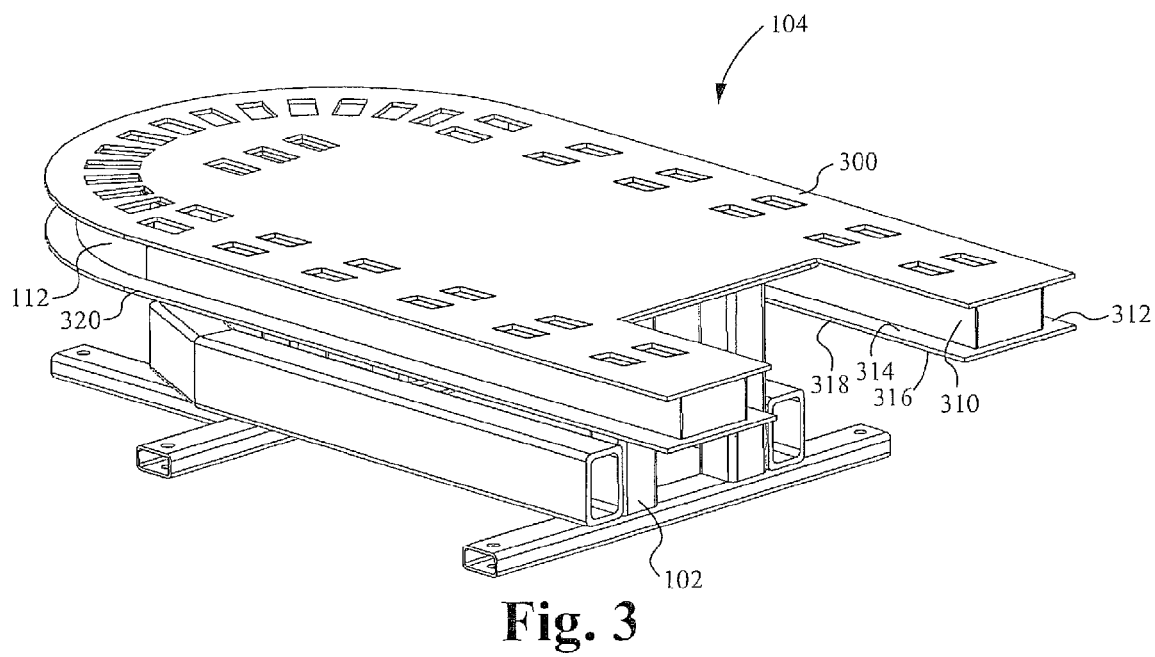
FIG. 3 illustrates a perspective view of a deck according to some embodiments.

FIG. 3 illustrates a perspective view of a deck according to some embodiments. The deck 104 includes a platform 300, several support structures 102 (FIG. 1) and the track 112. As described, the track 112 enables the towers 108 (FIG. 1) to move about the platform 300. The track 112 includes an inner lip 310 and an outer lip 312. Additionally each of the lips include a top surface 314 and a bottom surface 316. There is also an inner lip edge 318 and an outer lip edge 320. The support structures 102 (FIG. 1) are configured in a way to support the weight of the motorcycle as well as enable the repair of the motorcycle frame.

Figure 4:
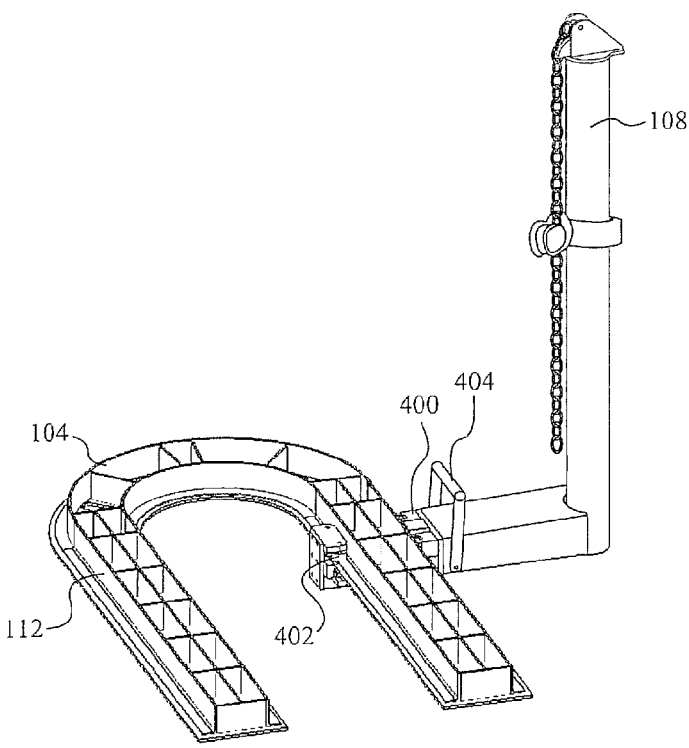
FIG. 4 illustrates a cross section view of a deck and tower according to some embodiments.

FIG. 4 illustrates a cross section view of a deck and tower according to some embodiments. The tower 108 is coupled to the deck 104 with a rolling bracket 400 that includes one or more rollers 402 and is adjustable and lockable using a lever 404. The rollers 402 permit the rolling bracket 400 to be secured to the deck 104 while also having the ability to roll to various locations on the track 112. The lever 404 is able to be used to lock the tower 108 in place. Although FIG. 4 shows a specific implementation of how the tower 108 is coupled to the deck 104, any other configurations are able to be used to couple the tower 108 to the deck 104.

Figure 5:
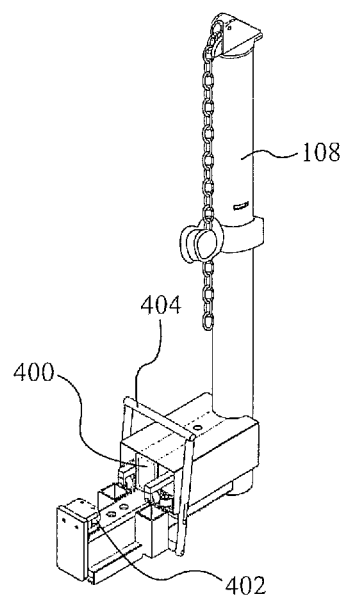
FIG. 5 illustrates a perspective view of a tower with a rolling bracket according to some embodiments.

FIG. 5 illustrates a perspective view of a tower with a rolling bracket according to some embodiments. As described in FIG. 4, the tower 108 includes the rolling bracket 400 with one or more rollers 402. The exemplary rolling bracket 400 shows rollers 402 configured to be positioned above a top surface 314 (FIG. 3) of a lip of the track 112 (FIG. 1) and below a bottom surface 316 (FIG. 3) of the lip of the track 112 (FIG. 1). Further, the rollers 402 are configured to be positioned on each of the inner lip 310 (FIG. 3) and outer lip 312 (FIG. 3) of the track 112 (FIG. 1). Additional rollers are configured to be positioned against the inner lip edge 318 (FIG. 3) and the outer lip edge 320 (FIG. 3). The rollers 402 are able to be any type of rolling mechanism such as wheels or ball bearings.

Figure 6:
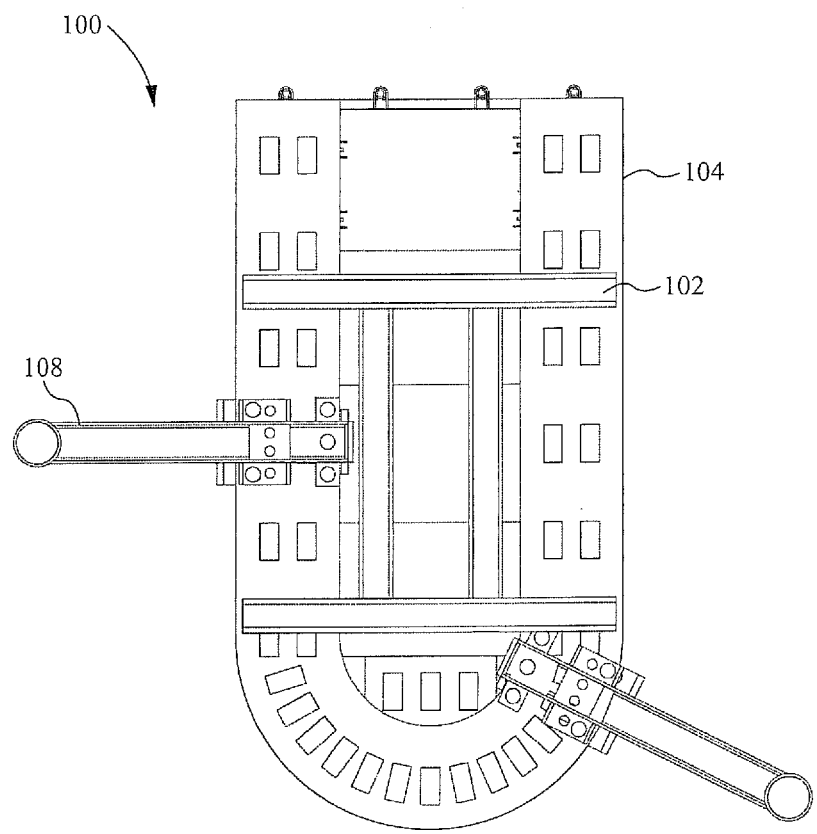
FIG. 6 illustrates a bottom view of the rack according to some embodiments.
Figure 7:
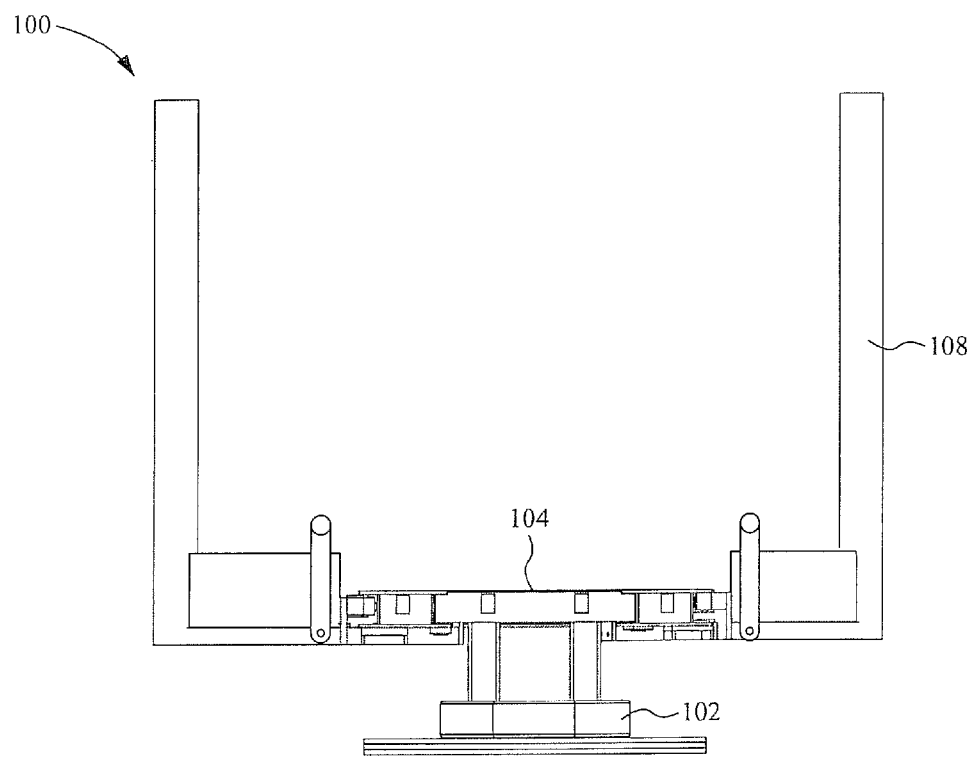
FIG. 7 illustrates a side view of the rack according to some embodiments.
Figure 8:
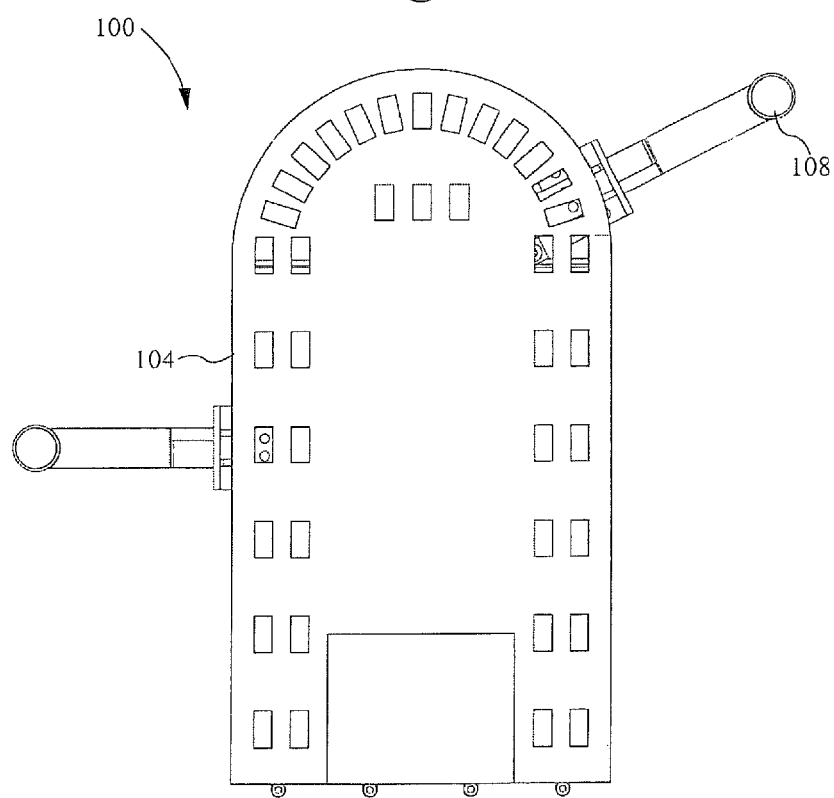
FIG. 8 illustrates a top view of the rack according to some embodiments.

FIG. 6 illustrates a bottom view of the rack according to some embodiments. As shown, the rack 100 includes the deck 104, the towers 108 and the support structure 102. FIG. 7 illustrates a side view of the rack according to some embodiments. As shown, the rack 100 includes the deck 104, the towers 108 and the support structure 102. FIG. 8 illustrates a top view of the rack according to some embodiments. As shown, the rack 100 includes the deck 104 and the towers 108.

Figure 9:
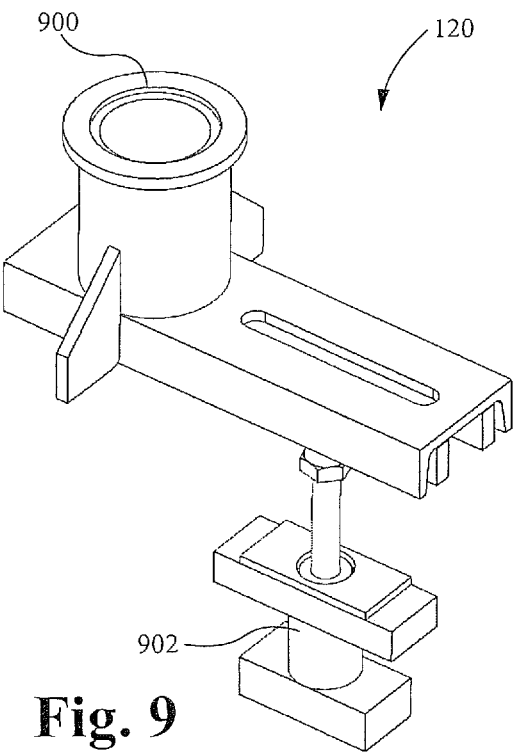
FIG. 9 illustrates a side perspective view of a clamp according to some embodiments.
Figure 10:
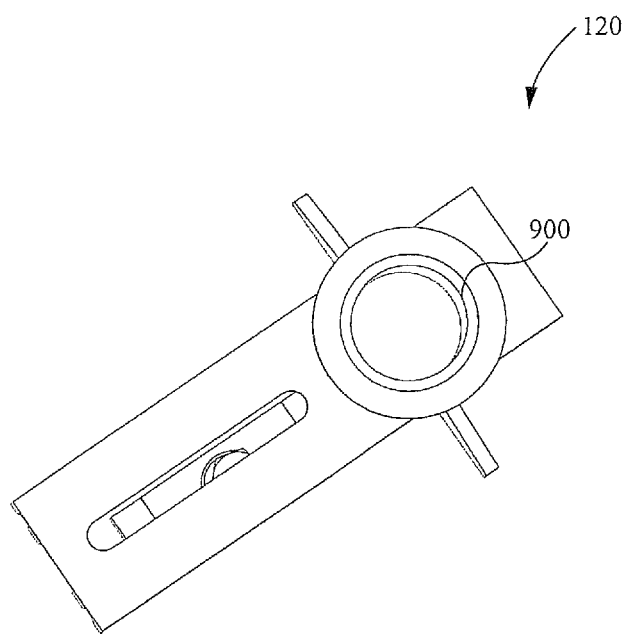
FIG. 10 illustrates a top perspective view of a clamp according to some embodiments.

FIG. 9 illustrates a side perspective view of a clamp according to some embodiments. The clamp 120 includes an aperture 900 for receiving a mount 122 (FIG. 1) and a bracket 902 for insertion into the deck 104 (FIG. 1). FIG. 10 illustrates a top perspective view of a clamp according to some embodiments. As described in FIG. 9, the clamp 120 includes an aperture 900 for receiving a mount 122 (FIG. 1).

Figure 11:
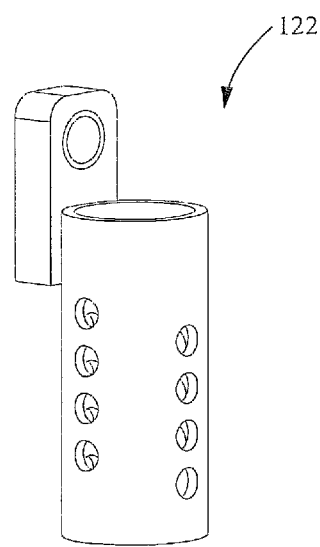
FIG. 11 illustrates a perspective view of a mount according to some embodiments.

FIG. 11 illustrates a perspective view of a mount according to some embodiments. The mount 122 is configured for insertion into the clamp 120 (FIG. 1) and for securing the motorcycle in place.

Figure 12:
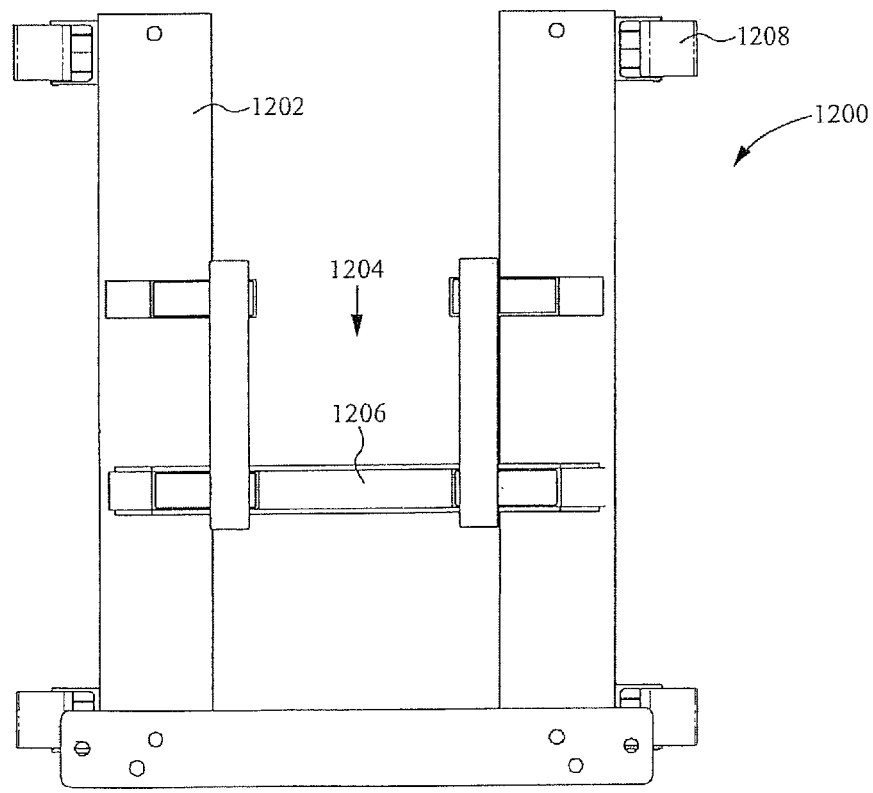
FIG. 12 illustrates a top view of a dolly according to some embodiments.
Figure 13:
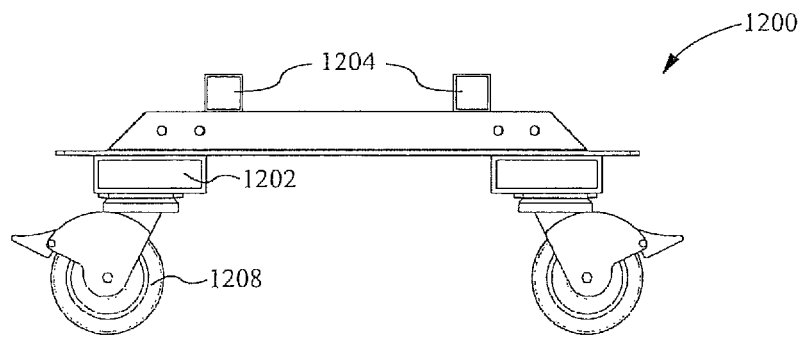
FIG. 13 illustrates a front view of a dolly according to some embodiments.
Figure 14:
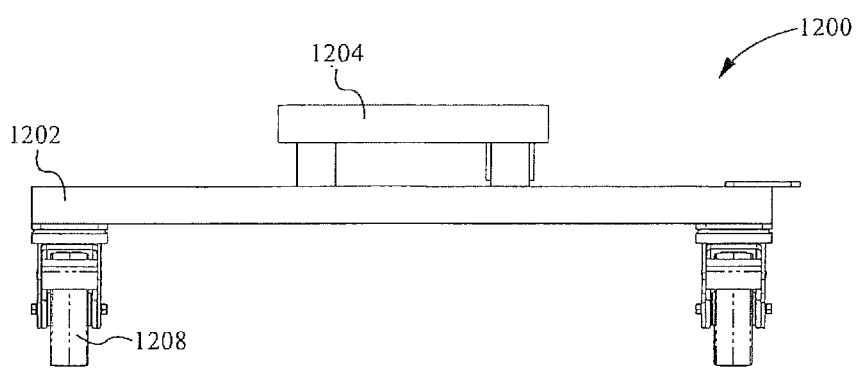
FIG. 14 illustrates a back view of a dolly according to some embodiments.

FIGS. 12-14 illustrate a dolly according to some embodiments. The dolly 1200 includes a base 1202, a top frame 1204, a brace 1206 and a set of wheels 1208. The dolly 1200 is configured to be able to be used to transport a motorcycle onto the rack 100 (FIG. 1).

Figure 15:
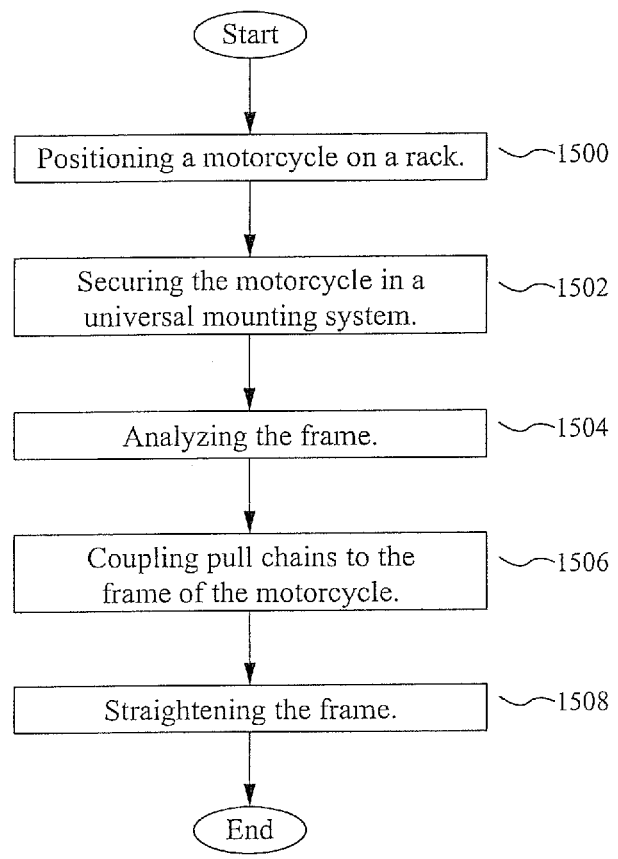
FIG. 15 illustrates a flowchart of a method of using the rack according to some embodiments.

FIG. 15 illustrates a flowchart of a method of using the rack according to some embodiments. In the step 1500, a motorcycle is positioned on the rack. Positioning is able to be by driving or pushing the motorcycle onto the rack utilizing a ramp, or using a dolly to push the motorcycle on the rack, or any other means. In the step 1502, the motorcycle is secured in the universal mounting system. The universal mounting system is able to be implemented in any manner to receive any type of motorcycle and secure the motorcycle in place to enable frame adjustment to be performed. In the step 1504, the frame of the motorcycle is analyzed with the measuring system. The analysis of the frame is able to be performed using any method including a laser measuring system which compares original specifications of the frame with measured specifications. In another implementation, the frame is analyzed using a manual tool such as a straight edge. In the step 1506, chains are coupled to the frame. The chains are coupled in an appropriate configuration based on the damage of the frame. For example, if a frame is bent such that the frame needs to be straightened slightly, the chains are positioned at either end of the frame to enable pulling of the frame which will straighten the frame. In another example, if a left arm of a frame is bent, the chains are positioned on the same arm to pull the arm appropriately. In the step 1508, the frame is adjusted using the chains. Adjusting is able to be by automatically or manually moving the towers which are coupled to the chains which then pull the frame accordingly, and/or moving the chains while keeping the towers stationary to pull the frame accordingly. In some embodiments, fewer or more steps are implemented. For example, in some embodiments, one or more parts are removed from the motorcycle before coupling the chains to the frame. In some embodiments, the order of the steps is modified.

Figure 16:
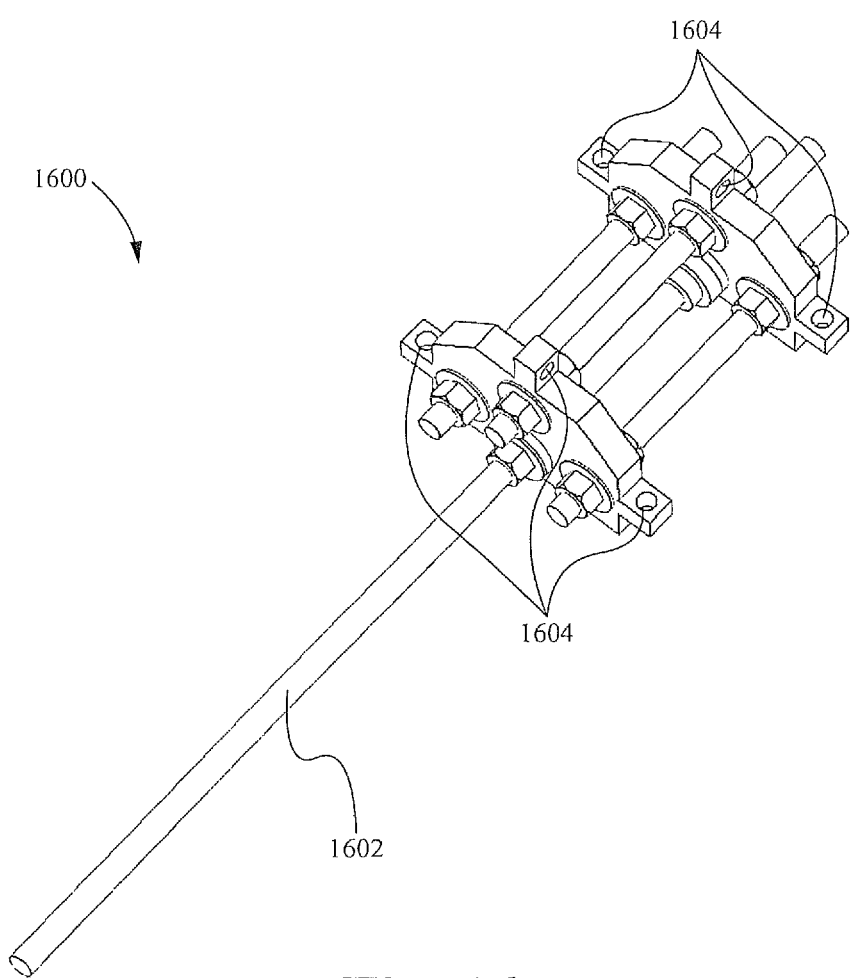
FIG. 16 illustrates a perspective view of a neck puller according to some embodiments.

FIG. 16 illustrates a perspective view of a neck puller according to some embodiments. The neck puller 1600 includes a bar 1602 for insertion into a motorcycle neck as well as one or more pulling points 1604 for coupling chains 110 (FIG. 1) to or any other mechanism for repairing the neck (e.g. by pulling the neck in one or more directions). The bar 1602 provides leverage to facilitate the pulling operation.

Figure 17:
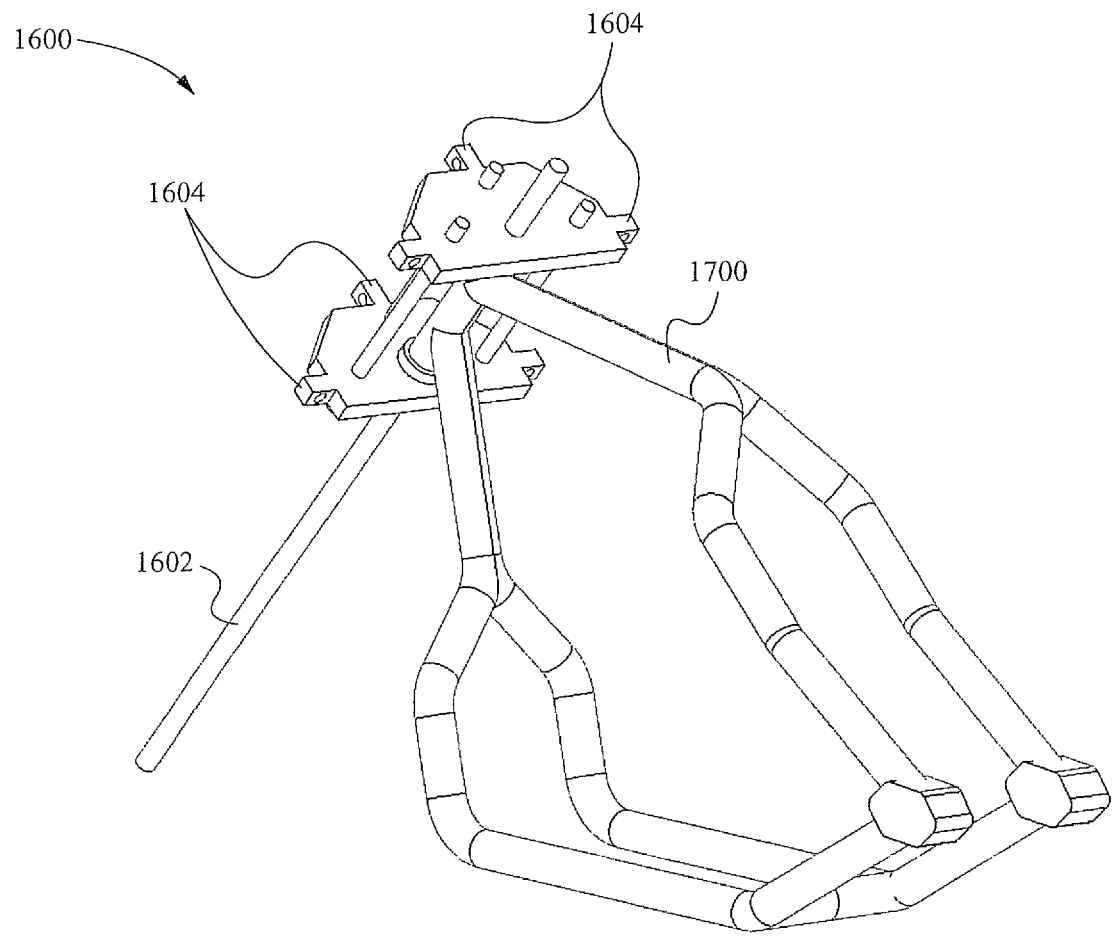
FIG. 17 illustrates a perspective view of a motorcycle frame coupled to a neck puller according to some embodiments.

FIG. 17 illustrates a perspective view of a motorcycle frame coupled to a neck puller according to some embodiments. The neck puller 1600 includes a bar 1602 for insertion into a motorcycle neck as well as one or more pulling points 1604 for coupling chains 110 (FIG. 1) to or any other mechanism for repairing the neck of the motorcycle frame 1700 (e.g. by pulling the neck in one or more directions). The bar 1602 provides leverage to facilitate the pulling operation.

Figure 18:
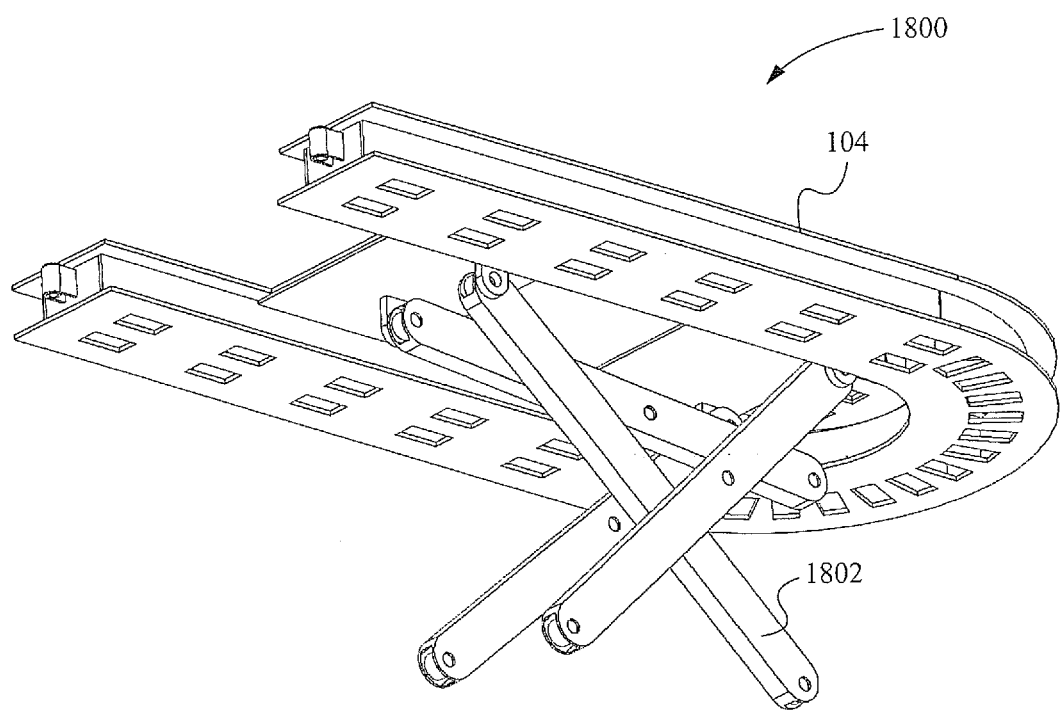
FIG. 18 illustrates a perspective view of a folding rack according to some embodiments.

FIG. 18 illustrates a perspective view of a folding rack according to some embodiments. The folding rack 1800 includes a deck 104 and any of the other components shown herein (e.g., shown in FIG. 1). The folding rack 1800 also includes folding legs 1802 which couple to the deck 104. The folding legs 1802 enable the deck 104 to be raised and lowered to a desired height such as a compact position with the deck 104 lowered completely and an extended position with the deck 104 raised at a maximum. In some embodiments, the legs 1802 are able to fit within a cavity in the deck 104.

Figure 19:
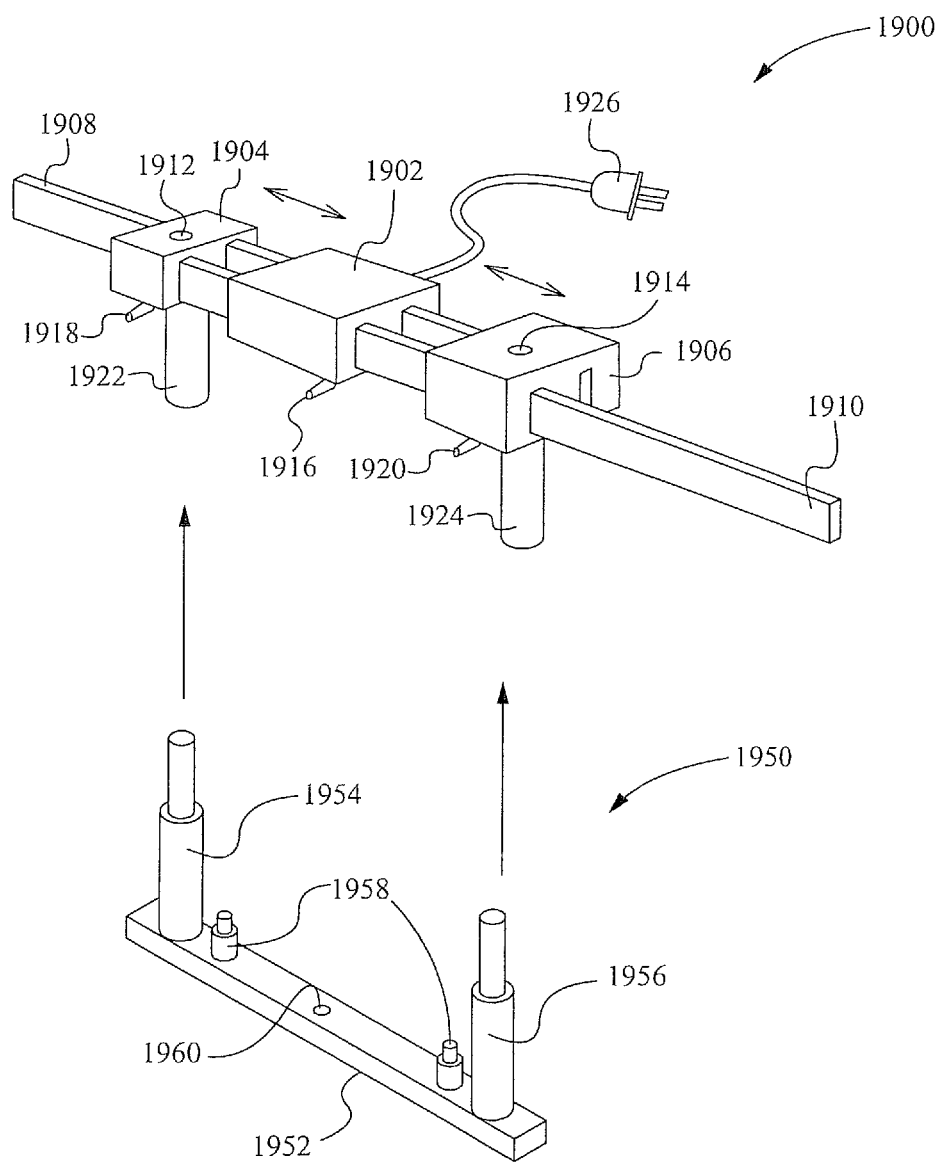
FIG. 19 illustrates a perspective view of a self-centering laser measuring system according to some embodiments.

FIG. 19 illustrates a perspective view of a self-centering laser measuring system according to some embodiments. The measuring system includes a universal mounting laser device 1900 which includes a central component 1902, a left component 1904 and a right component 1906. The central component 1902 has a first bar 1908 and a second bar 1910 passing through. The first bar 1908 passes through the left component 1904, and the second bar 1910 pass through the right component 1906. The end of the first bar 1908 ends at the right component 1906, and the end of the second bar 1910 ends at the left component 1904. The first bar 1908 and the second bar 1910 are configured to enable the left component 1904 and the right component 1906 to move toward and away from the central component 1902 equally at the same time, thus keeping the cental component 1902 an equal distance from the left component 1904 and the right component 1906 at all times. Therefore, the universal mounting laser device 1900 is self centering. In some embodiments, a mechanism or motor is contained within the central component 1902 for ensuring the left component 1904 and the right component 1906 move toward and away from the central component 1902 equally at the same time. The left component 1904 includes a first mounting hole 1912, and the right component 1906 includes a second mounting hole 1914. The mounting holes 1912, 1914 are configured to receive mounting rods 1954, 1956, respectively. The central component 1902 includes a center laser 1916, the left component 1904 includes a left laser 1918 and the right component 1906 includes a right laser 1920. The center laser 1916 is able to rotate and point to the center of the motorcycle width-wise. The left laser 1918 and the right laser 1920 are able to rotate and point to targets of the motorcycle frame. The lasers enable a user to view or measure any defects or problems with the chassis/frame (e.g., a bent frame) of the motorcycle which are then able to be corrected using the rack system described herein. A power source 1926 is included to power the lasers 1916, 1918, 1924. In some embodiments, the power source 1926 includes a cord and plug for receiving power through a power outlet, a battery, a solar cell, and/or any other power source/receiving device.

A mounting bracket 1950 is motorcycle-specific, designed/sized to fit on a specific motorcycle. For example, the mounting bracket 1950 is wider for a wider motorcycle and narrower for a narrower motorcycle. The mounting bracket includes a base 1952, a first mounting rod 1954, a second mounting rod 1956, spacers 1958 and a central point 1960. The spacers 1958 are used to mount the mounting bracket onto symmetrical mounting points on the motorcycle under the seat. The central point 1960 is able to be used to center the universal mounting laser device 1900 using the center laser 1916. As described above, the first mounting rod 1954 and the second mounting rod 1956 are used to couple the universal mounting laser device 1900 to the mounting bracket 1950 by insertion into the mounting holes 1912, 1914. The universal mounting laser device 1900 is able to expand or contract so that the mounting holes 1912 and 1914 are able to be placed on the motorcycle-specific mounting rods 1954 and 1956.

Figure 20:
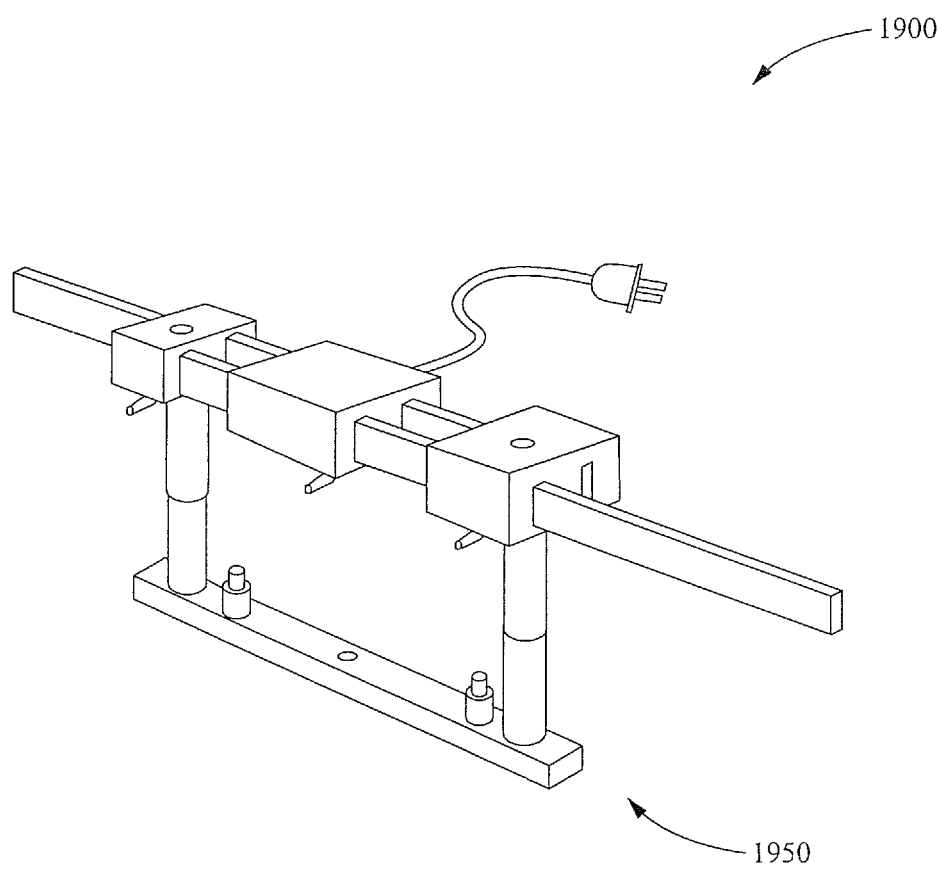
FIG. 20 illustrates a perspective view of a self-centering laser measuring system according to some embodiments.

FIG. 20 illustrates a perspective view of a self-centering laser measuring system according to some embodiments. The universal mounting laser device 1900 and the mounting bracket 1950 are shown coupled together.

Figure 21:
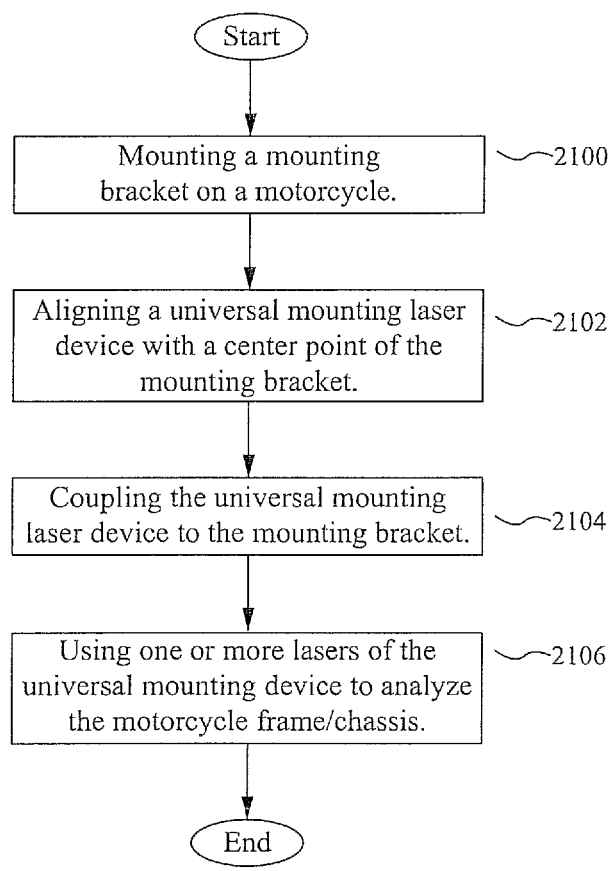
FIG. 21 illustrates a flowchart of a method of using the self-centering laser measuring system according to some embodiments.

FIG. 21 illustrates a flowchart of a method of utilizing the self-centering laser measuring system according to some embodiments. In the step 2100, a mounting bracket is mounted on a motorcycle (e.g., mounted to mounting points under a seat of the motorcycle). In the step 2102, the universal mounting laser device is lined up with the center point of the mounting bracket. In the step 2104, the universal mounting laser device is coupled to the mounting bracket by insertion of the mounting rods of the mounting bracket into mounting holes of the universal mounting laser device. The universal mounting laser device is expanded or contracted to a size so that the holes align with the mounting rods. The expansion and contraction are able to be performed by manually pulling the left and right components of the universal mounting laser device apart or pushing them together. In some embodiments, a motor automatically expands or contracts universal mounting laser device. In the step 2106, one or more lasers of the universal mounting laser device are used to analyze the motorcycle frame/chassis. The lasers are rotatable (e.g., the center laser rotates so that the laser points from the neck of the bike to the rear of the bike to detect any offsets from the center such as due to a bent frame, and the left and right lasers rotate to targets to detect any damage in the frame/chassis). In some embodiments, after the damage to the motorcycle frame/chassis is determined, the frame/chassis is repaired using the rack as described herein. The universal mounting laser device is able to be used before, during and/or after the repair process to ensure the frame/chassis is repaired properly (e.g., repaired to the original specifications). In some embodiments, fewer or more steps are implemented. In some embodiments, the order of the steps is modified.

Figure 23:
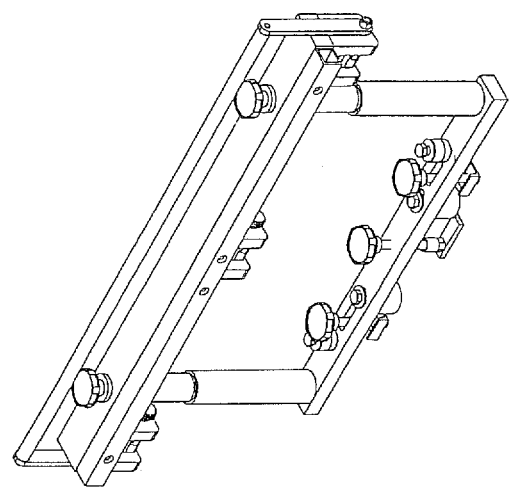
FIG. 23 illustrates a perspective view of a self-centering laser measuring system according to some embodiments.
Figure 22:
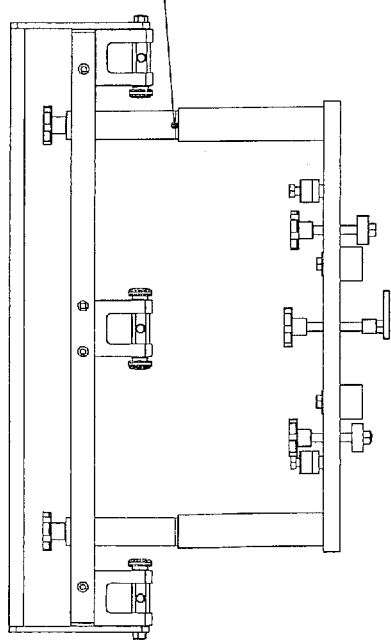
FIG. 22 illustrates a front view of a self-centering laser measuring system according to some embodiments.

FIG. 22 illustrates a front view of a self-centering laser measuring system according to some embodiments. As described herein, the self-centering laser measuring system includes multiple lasers for measuring and aligning the motorcycle frame. The laser measuring system also includes a mounting bracket which is configured to mount to a motorcycle. The mounting device is configured to couple with a self-centering laser device. FIG. 23 illustrates a perspective view of a self-centering laser measuring system according to some embodiments.

Figure 24:
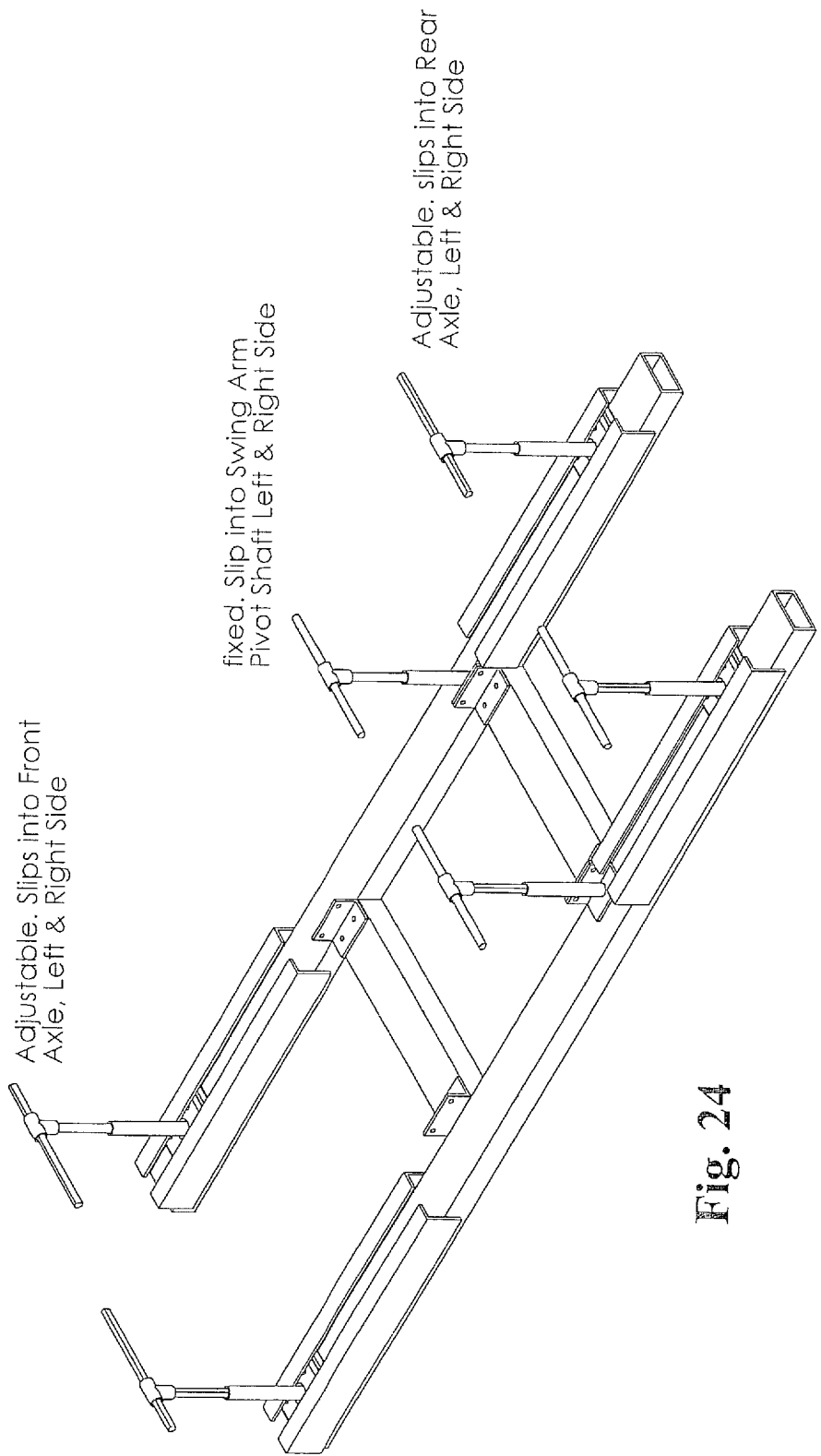
FIG. 24 illustrates a perspective view of an alignment system according to some embodiments.

FIG. 24 illustrates a perspective view of an alignment system according to some embodiments. The alignment system includes a pair of front end bars which are adjustable and are configured for insertion into a front axle from the left and right side. The front end bars are configured perpendicular to vertical rods which are positioned on a track within the front of a base structure. The alignment system also includes a pair of fixed bars which fit into a swing arm of a motorcycle. The fixed bars are also on the left and right side, and are coupled to the base structure. A pair of rear end bars are included with the alignment system. The rear end bars are adjustable and are configured for insertion into a rear axle from the left and right side. The rear end bars are configured perpendicular to vertical rods which are positioned on a track within the rear of the base structure. The alignment system is able to be used to secure and adjust a motorcycles frame by pulling, pushing, bending and/or other movements. The alignment system is able to be used on the ground as a stand-alone device. The alignment system is able to be used with the rack described herein. The alignment system is able to be used with any motorcycle service lift.

Although a motorcycle frame has been described as being repaired using the rack, any device is able to be repaired such as a moped or a scooter.

To utilize the motorcycle frame rack, a motorcycle is positioned on the rack in a universal mounting system. The damage to the frame is determined using a measuring system. Then, chains coupled to towers are coupled to the frame which adjust the frame to the frame's original configuration or at least approximately the original configuration by pulling the frame at the appropriate points and angles.

In operation, the motorcycle frame rack reduces the time and cost of repairing a motorcycle frame by enabling a frame to be repaired without requiring the motorcycle to be taken apart.

Examples of suitable computing devices to be used with the motorcycle frame rack include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad or any other suitable computing device.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A device for repairing a motorcycle frame comprising:
   a. a deck;
   b. a ramp;
   c. one or more towers positioned near the deck;
   d. a cable coupled to each of the one or more towers for coupling to the motorcycle frame for adjusting the motorcycle frame;
   e. a universal mounting system for receiving and securing any type of motorcycle to the deck, wherein the motorcycle is rolled up the ramp to be positioned on and secured to the deck, and further wherein the universal mounting system includes a plurality of universal clamps and a plurality of universal mounts, further wherein each of the universal clamps includes an aperture for receiving a universal mount of the plurality of universal mounts and a bracket for insertion into the top of the deck, further wherein the bracket secures a universal clamp of the plurality of universal clamps to the deck by insertion of a protrusion of the bracket through a single slotted aperture in the universal clamp of the plurality of universal clamps; and
   f. a neck puller for inserting into a neck of the motorcycle, wherein the neck puller includes a bar and one or more pulling points, further wherein the bar is inserted into the neck of the motorcycle, and the one or more pulling points are configured to receive the one or more cables to adjust the neck of the motorcycle.

2. The device of claim 1 further comprising a measuring system for measuring the motorcycle frame.

3. The device of claim 2 wherein the measuring system comprises a laser measuring system.

4. The device of claim 3 wherein the laser measuring system comprises a central laser component, a left side laser component and a right side laser component.

5. The device of claim 4 wherein the laser measuring system enables a user to view or measure any defects in the motorcycle frame.

6. The device of claim 1 further comprising a computing device and a printer coupled to the measuring system for receiving measurement information from the measuring system.

7. The device of claim 6 wherein before and after frame specifications are accessible by the computing device.

8. The device of claim 1 wherein the deck comprises a track for enabling the one or more towers to move around the deck.

9. The device of claim 1 wherein a dolly is used to position the motorcycle on the deck.

10. The device of claim 1 wherein the cable comprises a chain.

11. A method of repairing a motorcycle frame comprising:
    a. positioning a motorcycle on a rack by rolling the motorcycle up a ramp and onto the rack;
    b. securing the motorcycle to the rack with a universal mounting system configured for receiving and securing any type of motorcycle to a deck, wherein the universal mounting system includes a plurality of universal clamps and a plurality of universal mounts, further wherein each of the universal clamps includes an aperture for receiving a universal mount of the plurality of universal mounts and a bracket for insertion into the top of the deck, further wherein the bracket secures a universal clamp of the plurality of universal clamps to the deck by insertion of a protrusion of the bracket through a slotted aperture in the universal clamp of the plurality of universal clamps;
    c. analyzing the motorcycle frame of the motorcycle;
    d. coupling one or more cables to the motorcycle frame, wherein the one or more cables are coupled to one or more towers;
    e. adjusting the motorcycle frame to approximately an original configuration; and
    f. inserting a neck puller into a neck of the motorcycle, wherein the neck puller includes a bar and one or more pulling points, further wherein the bar is inserted into the neck of the motorcycle, and the one or more pulling points are configured to receive the one or more cables to adjust the neck of the motorcycle.

12. The method of claim 11 wherein analyzing the motorcycle frame is performed by a laser measuring system.

13. The method of claim 11 wherein adjusting the motorcycle frame comprises moving the one or more towers which pull the motorcycle frame in one or more directions.

14. The method of claim 13 wherein adjusting the motorcycle frame is performed automatically.

15. The method of claim 13 wherein adjusting the motorcycle frame is performed manually.

16. The method of claim 11 wherein the original configuration is based on factory specifications stored within a computing device coupled to the rack.

17. The method of claim 11 wherein the one or more cables comprise one or more chains.

18. A device for repairing a motorcycle frame comprising:
    a. a deck with a track;
    b. a ramp;
    c. a universal mounting system configured for receiving and securing any type of motorcycle to the deck, wherein the motorcycle is rolled up the ramp to be positioned on and secured to the deck, and further wherein the universal mounting system includes a plurality of universal clamps and a plurality of universal mounts, further wherein each of the universal clamps includes an aperture for receiving a universal mount of the plurality of universal mounts and a bracket for insertion into the top of the deck, further wherein the bracket secures a universal clamp of the plurality of universal clamps to the deck by insertion of a protrusion of the bracket through a single slotted aperture configured to enable a position of the bracket to be adjusted relative to the universal clamp in the universal clamp of the plurality of universal clamps, further wherein each of the universal mounts includes a plurality of apertures for adjusting the height of the universal mount;

d. a laser measuring system configured for measuring the motorcycle frame;

e. one or more towers positioned near the deck, wherein the one or more towers are able to move around the deck along the track;

f. a cable coupled to each of the one or more towers for coupling to the motorcycle frame for adjusting the motorcycle frame; and g. a neck puller for inserting into a neck of the motorcycle, wherein the neck puller includes a bar and one or more pulling points, further wherein the bar is inserted into the neck of the motorcycle, and the one or more pulling points are configured to receive the one or more cables to adjust the neck of the motorcycle.

19. The device of claim 18 further comprising a computing device and a printer coupled to the laser measuring system for receiving measurement information from the laser measuring system.

20. The device of claim 19 wherein current measured frame information and factory specifications are accessible by the computing device.

21. The device of claim 18 wherein the cable comprises a chain.

* * * * *